No. 861,121. PATENTED JULY 23, 1907.
R. B. HUMAN.
STALK CUTTER.
APPLICATION FILED MAY 7, 1907.

WITNESSES
J. T. Brophy

INVENTOR
Robert B. Human
BY Munn & Co
ATTORNEYS

UNITED STATES PATENT OFFICE.

ROBERT B. HUMAN, OF CHICKASHA, INDIAN TERRITORY.

STALK-CUTTER.

No. 861,121.    Specification of Letters Patent.    Patented July 23, 1907.

Application filed May 7, 1907. Serial No. 372,334.

*To all whom it may concern:*

Be it known that I, ROBERT B. HUMAN, a citizen of the United States, and a resident of Chickasha, in District 19, Indian Territory, have invented a new and useful Improvement in Stalk-Cutters, of which the following is a full, clear, and exact description.

The purpose of the invention is to provide a revolving stalk cutter adapted for use in cutting stalks of any description upon any character of ground, and which is absolutely complete in itself but is so constructed that it can be quickly and conveniently attached to different wheeled machines, for example, disk cultivators or disk harrows, particularly the form wherein there is no necessity for removing any of the regular parts of the machine, but wherein the cutter may be applied without disturbing any of the operating parts or interfering with their functions, the cutter being also capable of being almost instantly removed, leaving both it and the machine in tact.

It is a further purpose of the invention to so construct and connect the stalk cutter to a disk cultivator, that while it will not assist the cultivator it is assisted by the cultivator in doing its individual work as a stalk cutter.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
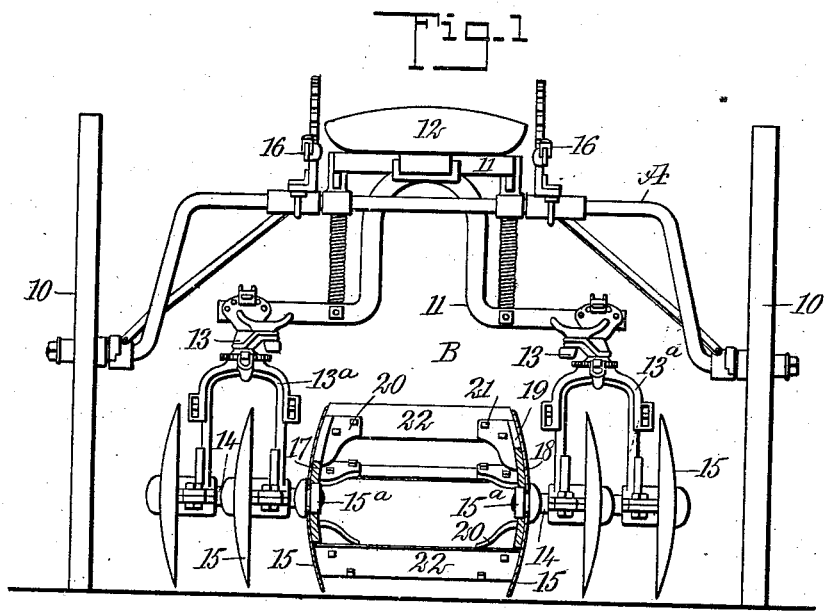
Figure 2:
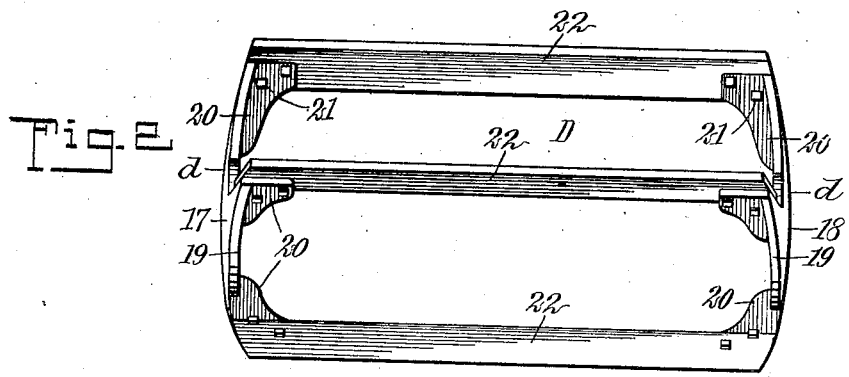

Figure 1 is a rear elevation of a disk cultivator and a longitudinal section through the applied cutter and a section through the cultivator disks between which the cutter is located; Fig. 2 is a side elevation of the stalk cutter; and Fig. 3 is a transverse section through the same.

In the drawings I have illustrated the stalk cutter as applied to an ordinary disk cultivator, wherein A represents the arched axle provided with the customary supporting wheels 10, and above the axle a seat frame 11 is located, extending to the spindles of the axle and on said frame the driver's seat 12 is located.

B represents the main frame of the cultivator, which is provided with rearwardly extending adjustable arms 13 provided each with a downwardly extending fork 13$^a$, and in these forks shafts 14 are mounted to revolve, each shaft being provided with a series of cultivator disks 15 having their outer faces convexed and their inner faces concaved, and one disk on each shaft is located outside of the end member of the fork supporting the shaft, and at the inner end of each of said shafts 14 a polygonal fastening device for the disks 15 is located and designated as 15$^a$. The main frame B is operated to raise and lower the cultivator disks by means of the customary levers 16.

Figure 3:
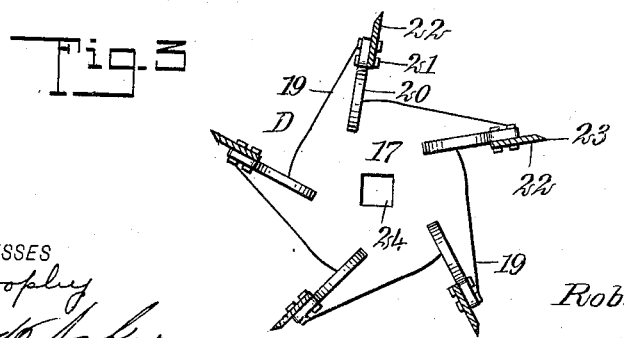

With reference to the stalk cutter D shown in detail in Figs. 2 and 3, this cutter consists of opposing heads 17 and 18 of spider-like construction, and outer faces d of these heads are convexed to conform to the concaved inner faces of the cultivator disks 15. The arms 19 produced on the heads 17 and 18 by the said spider-like construction have corresponding longitudinal edges inclined and their opposing longitudinal edges straight, as is best shown in Fig. 3, and at the straight longitudinal edge or face of each arm 19, an inwardly extending bracket 20 is formed, being at right angles to the arm carrying it and blades 22 connect the heads 17 and 18, being secured to the brackets by bolts 21 or their equivalents, and the cutting edges 23 of said blades extend a desired distance beyond the outer ends of the arms of the heads and the construction of the cutter D is completed by the formation in its heads of centrally located polygonal openings 24 adapted to receive the polygonal fastening devices 15$^a$ on the cultivator shafts 14 above referred to.

In making the application of the cutter to a disk cultivator, the forks 13$^a$ are adjusted outward so that the cutter D may be placed between the inner ends of the shafts 14 and then the said forks are adjusted inwardly until the polygonal fastening devices 15$^a$ enter the polygonal openings 24 in the heads of the cutter, as is shown in Fig. 1, whereupon the forks 13$^a$ are secured in position. Thus it will be observed that the attachment may be readily made and without disturbing any portion of the cutter or any portion of the implement to which the attachment is made.

It will be observed that in the attachment of the stalk cutter to or the detachment of the same from a disk cultivator no extra pieces or parts are used and none is required to be removed.

The device combines the features of light draft and a quick and easy method of attaching and detaching; it has no intricate parts to wear or to be adjusted or particularly operated; it has no bearings of any kind to become worn and it will operate on uneven land, as the disks will cut the limbs or branches and all stalks that lie close to the ground.

Having thus described my invention, I claim as new and desire to secure by Letters Patent,—

1. A stalk cutter comprising opposing heads having convexed outer faces, said heads being of spider-like construction, the arms formed thereby having brackets at corresponding longitudinal edges, and blades connecting the heads and secured to the brackets.

2. A stalk cutter comprising opposing heads of spider-like formation, said heads having convexed outer faces, the arms of the heads having correspondingly inclined and opposing straight longitudinal edges, brackets extending inward from the straight longitudinal edges of the arms of said heads, the heads having each a polygonal opening therein, and blades connecting the heads and secured to said brackets.

3. The combination with opposing shafts of an agricultural implement, disks upon said shafts having concaved inner and convexed outer faces and a polygonal fastening device at the inner end of each of the shafts, of a stalk cutter consisting of spider-like heads having convexed outer faces to fit to the concaved inner face of the inner disks on said shafts, and polygonal openings to receive said polygonal fastening devices, brackets located at corresponding longitudinal edges of the arms produced by said spider-like construction, and blades connecting the heads and secured to the brackets.

In testimony whereof I have signed my name to this specification in the presence of two subscribing witnesses.

ROBERT B. HUMAN.

Witnesses:
R. M. COCHRAN,
F. R. HARRISON.